US007497921B2

(12) United States Patent
Jones et al.

(10) Patent No.: US 7,497,921 B2
(45) Date of Patent: Mar. 3, 2009

(54) STRINGER HOLDING DEVICE

(75) Inventors: Darrell D. Jones, Mill Creek, WA (US);
Kurtis S. Willden, Kent, WA (US);
Michael A. Lee, Kent, WA (US);
Richard B. Evans, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 11/162,257

(22) Filed: Sep. 2, 2005

(65) Prior Publication Data

US 2008/0257490 A1    Oct. 23, 2008

(51) Int. Cl.
*B32B 37/00* (2006.01)
(52) U.S. Cl. .......................... 156/285; 264/101; 269/21
(58) Field of Classification Search ................. 156/285, 156/381, 382; 264/101; 269/20, 21

See application file for complete search history.

(56) References Cited

U.S. PATENT DOCUMENTS 6,449,848 B1 * 9/2002 Crocker et al. ............. 29/897.2
7,076,856 B2 * 7/2006 Sarh .......................... 29/524.1

* cited by examiner

*Primary Examiner*—Jeff H Aftergut
(74) *Attorney, Agent, or Firm*—Ostrager Chong Flaherty & Broitman P.C.

(57) ABSTRACT

An apparatus and method for securing a plurality of stringers to a mandrel during lay-up is provided, the plurality of stringers and mandrel forming a lay-up surface. The apparatus includes a vacuum source and a first vacuum attachment assembly in communication with said vacuum source to tightly secure the first vacuum attachment assembly down against the lay-up surface. A second vacuum attachment assembly is provided in communication with the vacuum source to force it tightly down against the lay-up. A flexible spacer is in rigid communication with the second vacuum attachment assembly and includes an extended end in communication with the first vacuum attachment assembly such that the flexible spacer presses one of the stringers against the mandrel.

35 Claims, 3 Drawing Sheets

STRINGER HOLDING DEVICE

TECHNICAL FIELD

The disclosure relates generally to a method an apparatus for securing stringers against a mandrel during lay-up manufacturing of aerospace composite structures, and more particularly to a method and apparatus utilizing daisy-chained vacuum assemblies to provide a quick and reliable method of securing the stringers in position on the lay-up surface.

BACKGROUND OF THE INVENTION

Aerospace and military applications often provide unique challenges to design and manufacturing. Composite lay-up structures are highly beneficial due to their high-strength and reduced weight characteristics. Manufacturing of such structures, however, often pose procedural and other difficulties when applied to large structures. Techniques developed for relatively small structures may become unwieldy and imprecise when applied to the large structures often found in aerospace applications. In order to accommodate these large structures, manufacturers often resort to smaller construction and corresponding assembly of such smaller portions into the desired large structure. This often places undesirable costs and time constraints on manufacturing.

This is especially true in manufacturing of composite structures such as composite fuselage/barrel sections. The mandrels used to lay-up such barrel sections are commonly large rotating structures. Structural stringers are commonly layed-up onto the mandrel and rotated in concert as a composite skin is laid-up on top. Manufacturing concerns arise when the stringers shift or fall out of the mandrel during such rotation. This is unacceptable in manufacturing and poses considerable cost risks to the lay-up procedure.

In response to such concerns, it has become common to place both stringers and mandrel into a vacuum-bag assembly and impose a strong vacuum. In this fashion, the stringers are compressed tightly against the mandrel and may remain in proper position during the subsequent outer skin lay-up. While this may provide a stop-gap approach to stringer shifting, it adds a considerable number of steps which impose time and cost constraints. It does so because the number of stringers that can be positioned in the vacuum bag is limited due to the same shifting or falling concerns as associated with the original lay-up procedures. Therefore, the present solution remains to place only a few stringers on the mandrel, place in a vacuum-bag, impose a vacuum, cut off the vacuum-bag, add more stringers, and repeat the process. Each step of the aforementioned process can frequently only process a limited percentage of the total number of stringers. This slows the manufacturing process down significantly and adds considerable cost.

That is needed is a method and apparatus for securing a greater number of stringers to the mandrel prior to the vacuum-bagging procedure such that the number of vacuum steps could be reduced. Additionally, it would be highly desirable to have a method and apparatus that insured both proper stringer alignment as well as close conformity of the stringers to the mandrel.

SUMMARY OF THE INVENTION

In accordance with the disclosure an apparatus for securing a plurality of stringers to a mandrel during lay-up is provided, the plurality of stringers and mandrel forming a lay-up surface. The apparatus includes a vacuum source and a first vacuum attachment assembly comprising a first vacuum cup assembly and a first flexible tube assembly in communication with said vacuum source to tightly secure the first vacuum attachment assembly down against the lay-up surface. A second vacuum attachment assembly comprises a second vacuum cup assembly and a second flexible tube assembly in communication with the vacuum source to force it tightly down against the lay-up surface. A flexible spacer is in rigid communication with the second vacuum cup assembly and includes an extended end in communication with the first vacuum cup assembly such that the flexible spacer presses one of the stringers against the mandrel.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
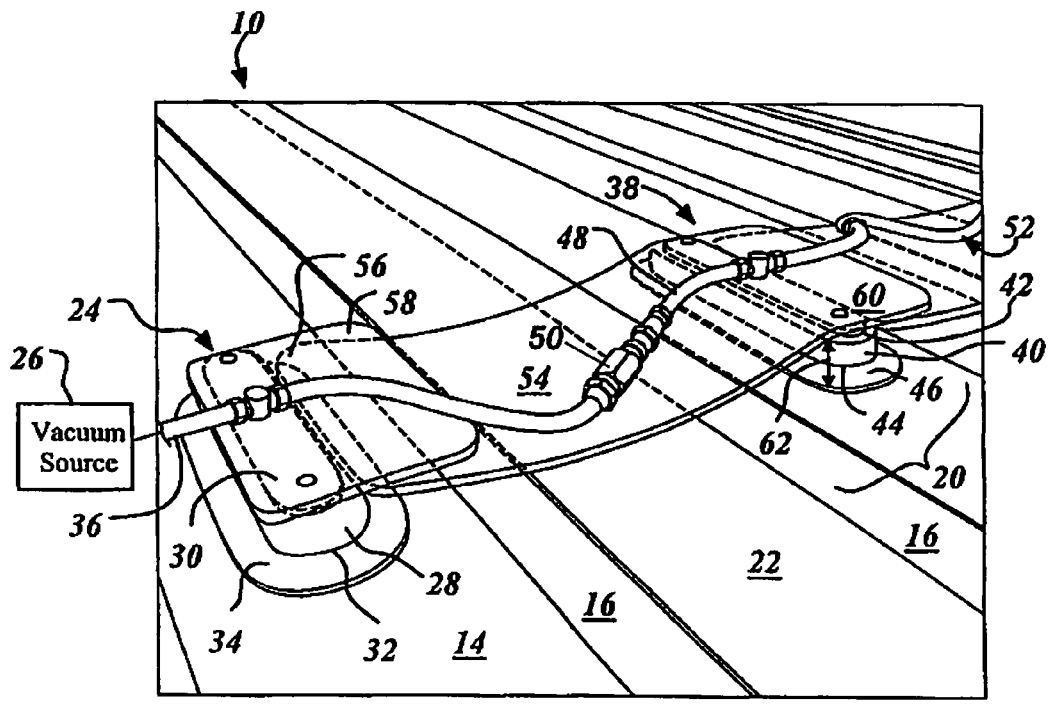
FIG. 1 is an illustration of an apparatus for securing stringers in accordance with the present invention.
Figure 4:
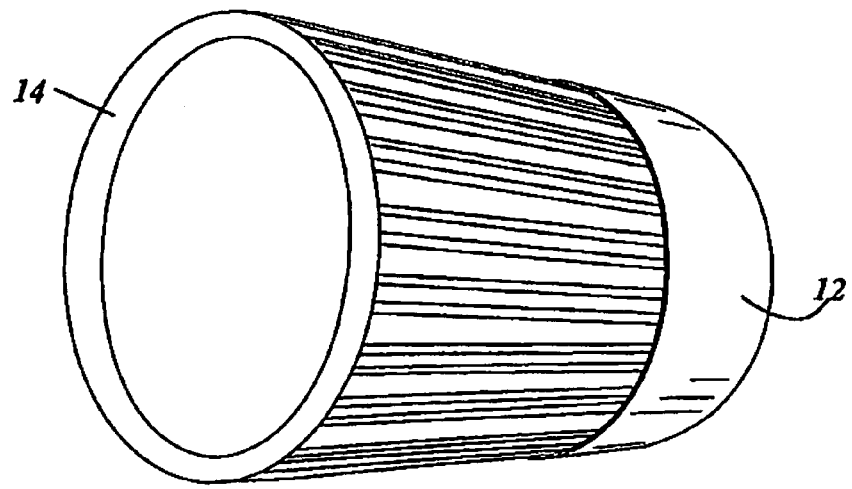
FIG. 4 is a detailed illustration of a full-sized mandrel for use with the apparatus for securing stringers illustrated in FIG. 1.
Figure 2:
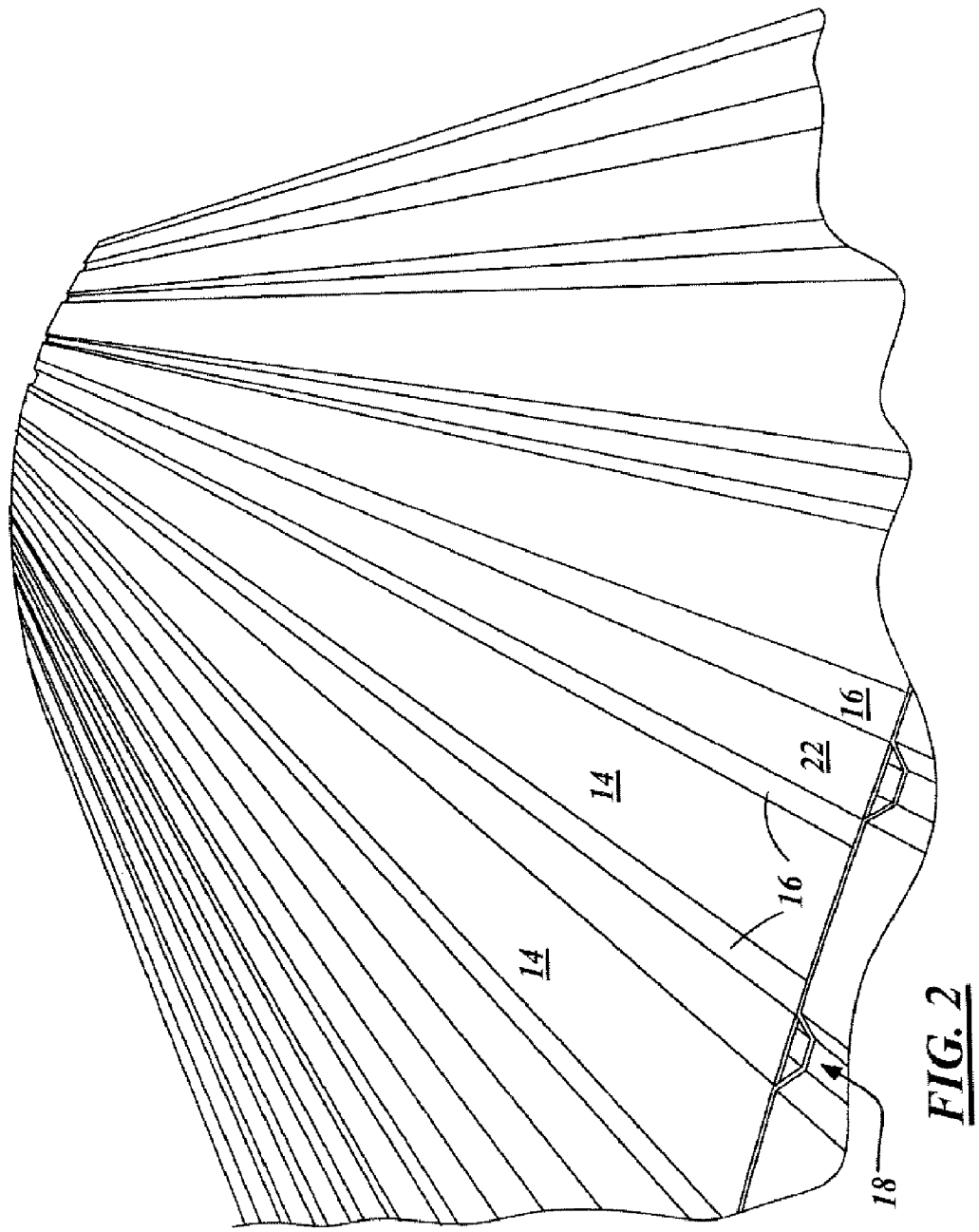
FIG. 2 is a detailed illustration of the stringer and mandrel lay-up illustrated in FIG. 1.

Referring now to FIGS. 1 through 4, which illustrate an apparatus 10 and method for laying-up large scale composite structures. Although a variety of structures are contemplated by the disclosure, the embodiments of the disclosure are directed towards lay-up construction of aircraft fuselage or other aircraft barrel structures. It is well known that such structures may be layed-up through the application of epoxy impregnated fibers or material 12 onto a mandrel 14 (see FIG. 4). The cylindrical rotating mandrel 14 is rotated as the material 12 is fed onto it. The impregnated material 12 is then cured to form a final product.

It is known, however, that such large scale structures require rigidity and stiffening support in order to obtain the desired performance characteristics. As such, a plurality of stringers 16 are commonly positioned on the mandrel 14 prior to material 12 lay-up. A known difficulty arises from the ability to keep the stringers 16 from shifting or falling off the mandrel 14 prior to material lay-up. The stringers 16 commonly have a u-shaped cross-section and are positioned in mould chambers 18 formed in the mandrel 14. In this fashion, the stringers 16 and mandrel 14 together generate a lay-up surface 20 on which to lay-up the impregnated material 12. Additional elements such as stringer bladder mandrels 22 (see FIGS. 1 and 2) may be positioned over open sections of the stringers 16 to prevent penetration of the material 12 into the stringers 16.

Figure 3:
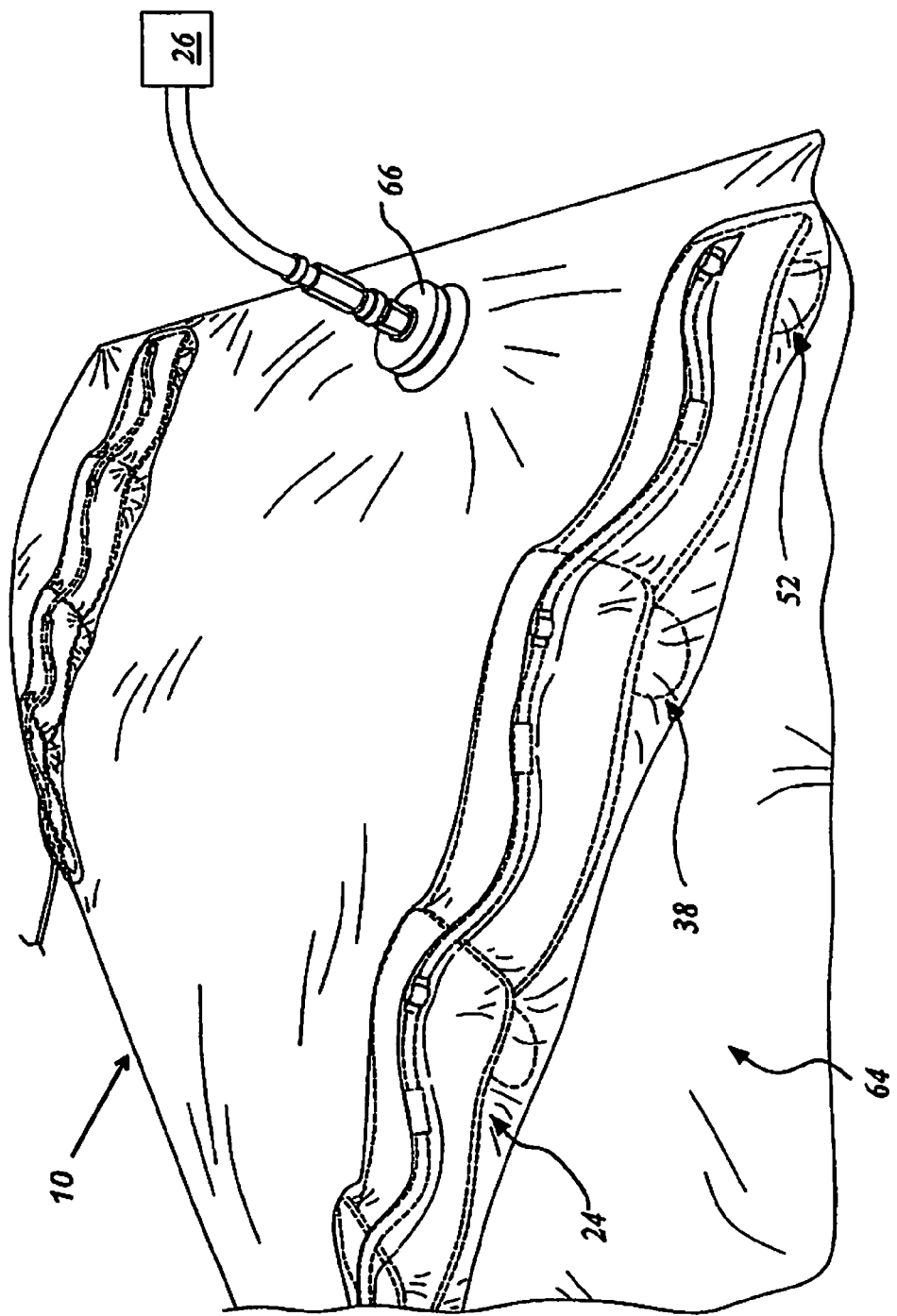
FIG. 3 is an illustration of a vacuum-bag procedure for use with the apparatus illustrated in FIG. 1.

The disclosure a unique approach to maintaining position of the stringers 16 during material 12 lay up in addition to insuring a tight compliance of the stringers 16 with the mandrel 14. Referring to FIGS. 1 and 3, this is accomplished through the use of a first vacuum attachment assembly 24 in communication with a vacuum source 26. Although a variety of first vacuum attachment assemblies 24 are contemplated, one embodiment contemplates the use of a first vacuum chamber 28 having a first upper chamber surface 30 and a first lower chamber surface 32. A first vacuum cup assembly 34 is affixed to the first lower chamber surface 32. A first flexible tube assembly 36 places the first vacuum attachment assembly 24 into communication with the vacuum source 26 such that the vacuum chamber 28 and vacuum cup assembly 34 are suctioned down tight against the lay-up surface 20. It should be noted that the lay-up surface 20 may encompass portions of the mandrel 14 and portions of the stringer 16 (see FIG. 1).

The apparatus 10 further includes a second vacuum attachment assembly 38 preferably positioned remotely on the lay-up surface 20 such that one of the stringers 16 is positioned between the first and second attachment assemblies 24,38. The second attachment assembly 38 preferably includes a second vacuum chamber 40 having a second upper chamber surface 42 and a second lower chamber surface 44. The second vacuum attachment assembly 38 is additionally in communication with the vacuum source 26 to suction it, and a second vacuum cup assembly 46, down tight against the lay-up surface 20. The second vacuum attachment assembly 38 is preferably placed in communication with the vacuum source 26 through the use of a second flexible tube assembly 48 placed in removable communication with the first flexible tube assembly 36. This is preferably accomplished through the use of a quick-disconnect fitting 50 such that a plurality of such additional vacuum attachment assemblies 52 may be daisy chained together to cover a large quantity of stringers 16 (see FIG. 3).

The second vacuum attachment assembly 38 further includes a flexible spacer 54 preferably mounted to the second chamber upper surface 42. The flexible spacer 54 is preferably a downwardly arched Plexiglas leaf spring that extends from the second chamber upper surface 42 towards an extended end 56 positioned near and in communication with the first vacuum attachment assembly 24. When the first and second vacuum attachment assemblies 24, 38 are attached to the vacuum source 26, they are suctioned onto the lay-up surface 20 and the flexible spacer 54 presses the stringer 16 down into communication with the mandrel 14. In addition, this pressure insures the stringer 16 does not shift or fall off the mandrel 14. Although the extended end 56 may be placed into communication with the first vacuum attachment assembly 24 in a variety of fashions, one embodiment contemplates the use of a first hold down lip 58 mounted to the first upper chamber surface 30. The use of the first hold down lip 58 allows a range of movement of the extended end 56 to accommodate a variety of stringer spacing while securing both spacing and downward pressure when the vacuum source 26 is engaged. In addition, the flexible spacer 54 may be extended past the second chamber upper surface 42 in order to form a second hold down lip 60. This is suitable for engaging the flexible spacers associated with additional daisy chained vacuum attachment assemblies 52.

In this fashion, a large number of stringers 16 may be held in place and conformed to the mandrel 14 with relative quickness and ease. In addition, the vacuum assemblies 24, 38, 52 preferably have a reduced profile 62 such that the vacuum assemblies 24, 38, 52 may remain in place while assemblies, stringers 16, and mandrel 14 may all be inserted into a large vacuum bag assembly 64 (see FIG. 3). The vacuum source 26 is then applied to a vacuum bag evacuation portal 66 and the stringers 16 are thereby compressed tightly against the mandrel 14. The vacuum bag assembly 64 may then be removed in addition to removal of the vacuum attachment assemblies 24, 38, 52 and the stringers 16 will remain secured in place on the mandrel 14 during the application of impregnated material 12. The disclosure allows for an indefinite quantity of stringers 16 to be vacuum bagged in a single step without concern for slippage or falling out. In this fashion, the disclosure provides considerable time and cost improvement potential to existing designs.

While the embodiments have been described in connection with one or more embodiments, it is to be understood that the specific mechanisms and techniques which have been described are merely illustrative of the principles of the disclosure, numerous modifications may be made to the methods and apparatus described without departing from the spirit and scope of the disclosure as defined by the appended claims.

What is claimed is:

1. A method of laying up a plurality of stringers on a mandrel to form a lay-up surface comprising:
    positioning a first stringer on the mandrel;
    placing a first vacuum attachment assembly into communication with the lay-up surface, said first vacuum attachment assembly comprising a first vacuum cup assembly; and a first flexible tube assembly;
    placing said first flexible tube assembly into communication with a vacuum source such that said first vacuum attachment assembly is secured to the lay-up surface;
    placing a second vacuum attachment assembly into communication with the lay up surface, said second vacuum attachment assembly comprising a second vacuum cup assembly, a second flexible tube assembly, and a flexible spacer;
    placing said second flexible tube assembly into communication with said first flexible tube assembly such that said second vacuum attachment assembly is secured to the lay-up surface, said flexible spacer having a extended end in communication with said first vacuum cup assembly such that when said vacuum source is engaged said flexible spacer presses said first stringers against the mandrel.

2. A method as described in claim 1, further comprising:
    placing said first stringer, said mandrel, said first vacuum attachment assembly, and said second vacuum attachment assembly into a vacuum bag assembly; and
    removing air from said vacuum bag assembly to compact said first stringer.

3. A method as described in claim 1, further comprising:
    placing a second stringer on the mandrel;
    placing an additional vacuum attachment assembly into communication with the lay up surface, said additional vacuum attachment assembly comprising an additional vacuum cup assembly, an additional flexible tube assembly, and an additional flexible spacer;
    placing said additional flexible tube assembly into communication with said second flexible tube assembly such that said additional vacuum attachment assembly is secured to the lay-up surface, said additional flexible spacer pressing said second stringers against the mandrel, said second vacuum attachment assembly and said additional vacuum attachment assembly acting in concert to secure said first and second stringers to the mandrel in addition to maintaining spacing between said first and second stringers.

4. A method as described in claim 3, further comprising:
    attaching a plurality of additional vacuum attachment assemblies and a plurality of additional stringers to said lay-up surface in a daisy chain configuration.

5. A method as described in claim 4, further comprising:
    placing said plurality of addition vacuum attachment assemblies and said plurality of additional stringers within a vacuum bag assembly; and
    removing air from said vacuum bag assembly to compact said plurality of additional stringers.

6. A method as described in claim 1, wherein said flexible spacer comprises an arched plexiglas leaf spring.

7. A method as described in claim 1, wherein said flexible spacer comprises a clear spacer.

8. A method as described in claim 5, wherein said plurality of additional vacuum attachment assemblies remain in communication with said vacuum source while in said vacuum bag assembly.

9. A method of laying up a plurality of stringers on a mandrel to form a lay-up surface comprising:
   positioning a stringer on the mandrel;
   placing a first vacuum attachment assembly into communication with the lay-up surface;
   placing said first vacuum attachment assembly into communication with a vacuum source such that said first vacuum attachment assembly is secured to the lay-up surface;
   placing a second vacuum attachment assembly into communication with the lay up surface;
   placing said second vacuum attachment assembly into communication with said vacuum source such that said second vacuum attachment assembly is secured to the lay- up surface;
   placing a flexible spacer having an extended end in communication with said first vacuum attachment assembly such that when said vacuum source is engaged said flexible spacer presses said stringer against the mandrel; and
   coupling said flexible spacer to said second vacuum attachment.

10. A method as described in claim 9, wherein said first vacuum attachment assembly comprises a first vacuum cup assembly and a first flexible tube assembly.

11. A method as described in claim 10, wherein said second vacuum attachment assembly comprises a second vacuum cup assembly and a second flexible tube assembly.

12. A method as described in claim 9, wherein said first vacuum attachment assembly is placed in communication with the vacuum source through a first flexible tube assembly and the second vacuum attachment assembly is placed in communication with the vacuum source through a second flexible tube assembly in communication with the first flexible tube assembly.

13. A method as described in claim 9, wherein said first vacuum attachment assembly is placed on a first side of the stringer and said second vacuum attachment assembly is placed on a second side of the stringer.

14. An apparatus for securing at least one stringer to a mandrel, comprising:
   at least one vacuum source;
   a first vacuum attachment assembly coupled to said at least one vacuum source:
   a second vacuum attachment assembly coupled to said at least one vacuum source; and
   a flexible spacer mounted to said second vacuum attachment assembly, said flexible spacer having an extended end removably engaged to said first vacuum attachment assembly such that when said vacuum source evacuates said first and said second vacuum attachments said flexible spacer presses the at least one stringer against the mandrel.

15. An apparatus as described in claim 14, wherein the first vacuum attachment assembly comprises:
   a first vacuum chamber comprising a first upper chamber surface and a first lower chamber surface;
   a first vacuum cup assembly in communication with said first lower chamber surface; and
   a first flexible tube assembly placing said vacuum source in communication with said first vacuum chamber through said first upper chamber surface, said vacuum source thereby sucking said first vacuum chamber and said first vacuum cup assembly tightly down against the mandrel when said vacuum source is engaged.

16. An apparatus as described in claim 15, wherein the second vacuum attachment assembly comprises:
   a second vacuum chamber comprising a second upper chamber surface and a second lower chamber surface;
   a second vacuum cup assembly in communication with said second lower chamber surface; and
   a second flexible tube assembly removably securable to said first flexible tube assembly such that said second flexible tube assembly is placed in communication with said vacuum source, said second flexible tube assembly placing said vacuum source in communication with said second vacuum chamber through said second upper chamber surface, said vacuum source thereby sucking said second vacuum chamber and second first vacuum cup assembly tightly down against mandrel when said vacuum source is engaged.

17. An apparatus as described in claim 16, wherein said flexible spacer is mounted to said second upper chamber surface.

18. An apparatus as described in claim 16, wherein said first vacuum chamber and said second vacuum chamber are configured to generate a reduced profile sufficient for said first and second vacuum chambers, said first and second flexible tube assemblies, and said flexible spacer to be positioned within a vacuum bag assembly while in communication with the mandrel and the at least one stringer.

19. An apparatus as described in claim 14, wherein said flexible spacer comprises an arched plexiglas leaf spring.

20. An apparatus for securing a plurality of stringers to a mandrel during lay-up, the plurality of stringers and mandrel forming a lay-up surface, comprising:
   a vacuum source;
   a first vacuum attachment assembly comprising:
   a first vacuum chamber comprising a first upper chamber surface and a first lower chamber surface;
   a first vacuum cup assembly in communication with said first lower chamber surface; and
   a first flexible tube assembly placing said vacuum source in communication with said first vacuum chamber through said first upper chamber surface, said vacuum source thereby sucking said first vacuum chamber and said first vacuum cup assembly tightly down against the lay-up surface when said vacuum source is engaged;
   a second vacuum attachment assembly comprising:
   a second vacuum chamber comprising a second upper chamber surface and a second lower chamber surface;
   a second vacuum cup assembly in communication with said second lower chamber surface;
   a second flexible tube assembly removably securable to said first flexible tube assembly such that said second flexible tube assembly is placed in communication with said vacuum source, said second flexible tube assembly placing said vacuum source in communication with said second vacuum chamber through said second upper chamber surface, said vacuum source thereby sucking said second vacuum chamber and second first vacuum cup assembly tightly down against the lay-up surface when said vacuum source is engaged; and a flexible spacer mounted to said second upper chamber surface, said flexible spacer having an extended end removably engaged to said first vacuum chamber such that when said vacuum source is engaged said flexible spacer presses one of the stringers against the mandrel and maintains stringer spacing.

21. An apparatus as described in claim 20, wherein said flexible spacer comprises an arched plexiglas leaf spring.

22. An apparatus as described in claim 20, wherein said flexible spacer comprises:
a second hold down lip extending past said second upper chamber surface opposite said extended end.

23. An apparatus as described in claim 20, further comprising:
a first hold down lip mounted to said first upper chamber surface, said extended end comprising a floating end removably engaging said first hold down lip when said vacuum source is engaged.

24. An apparatus as described in claim 20, wherein said flexible spacer comprises a clear spacer such that stringer lay-up may be visually inspected.

25. An apparatus as described in claim 20, wherein said first vacuum chamber and said second vacuum chamber are configured to generate a reduced profile sufficient for said first and second vacuum chambers, said first and second flexible hose assemblies, and said flexible spacer to be positioned within a vacuum bag assembly while in communication with the mandrel and stringers.

26. An apparatus as described in claim 20, further comprising:
a vacuum bag assembly positioned around said first and second vacuum chambers, said first and second flexible hose assemblies, and said flexible spacer.

27. An apparatus as described in claim 20, wherein said first flexible tube assembly is removably joined to said second flexible tube assembly through the use of a quick-disconnect fitting.

28. An apparatus as described in claim 20, further comprising:
a plurality of additional vacuum attachment assemblies identical to said second vacuum attachment assembly, said plurality of additional vacuum attachment assemblies daisy chained together to form an extended vacuum attachment assembly.

29. An apparatus for securing a plurality of stringers to a mandrel during lay-up, the plurality of stringers and mandrel forming a lay-up surface, comprising:
a vacuum source;
a first vacuum attachment assembly comprising:
a first vacuum cup assembly; and
a first flexible tube assembly placing said vacuum source in communication with said first vacuum cup assembly to force said first vacuum cup assembly tightly down against the lay-up surface when said vacuum source is engaged;
a second vacuum attachment assembly comprising:
a second vacuum cup assembly;
a second flexible tube assembly in communication with said first flexible tube assembly such that said second flexible tube assembly is placed in communication with said vacuum source, said second flexible tube assembly placing said vacuum source in communication with said second vacuum cup assembly to force said second first vacuum cup assembly tightly down against the lay-up surface when said vacuum source is engaged; and
a flexible spacer in rigid communication with said second vacuum cup assembly, said flexible spacer having an extended end in communication with said first vacuum cup assembly such that when said vacuum source is engaged said flexible spacer presses one of the stringers against the mandrel and maintains stringer spacing.

30. An apparatus as described in claim 29, wherein said flexible spacer comprises an arched plexiglas leaf spring.

31. An apparatus as described in claim 29, wherein said flexible spacer comprises:
a second hold down lip extending past said second vacuum cup assembly opposite said extended end.

32. An apparatus as described in claim 29, further comprising:
a first hold down lip mounted to said first vacuum cup assembly, said extended end comprising a floating end engaging said first hold down lip when said vacuum source is engaged.

33. An apparatus as described in claim 29, wherein said flexible spacer comprises a clear spacer such that stringer lay-up may be visually inspected.

34. An apparatus as described in claim 29, wherein said first vacuum cup assembly and said second vacuum cup assembly are configured to generate a reduced profile sufficient for said first and second vacuum cup assemblies, said first and second flexible hose assemblies, and said flexible spacer to be positioned within a vacuum bag assembly while in communication with the mandrel and stringers.

35. An apparatus as described in claim 29, further comprising:
a plurality of additional vacuum attachment assemblies identical to said second vacuum attachment assembly, said plurality of additional vacuum attachment assemblies daisy chained together to form an extended vacuum attachment assembly.

\* \* \* \* \*